United States Patent [19]

Serack

[11] Patent Number: 5,111,485
[45] Date of Patent: May 5, 1992

[54] METHOD OF AND CIRCUIT FOR SYNCHRONIZING DATA

[75] Inventor: James A. Serack, Ottawa, Canada

[73] Assignee: Northern Telecom Limited, Montreal, Canada

[21] Appl. No.: 524,903

[22] Filed: May 18, 1990

[51] Int. Cl.$^5$ .............................................. H04L 7/00
[52] U.S. Cl. .................................... 375/112; 370/101; 370/102; 370/105.3; 375/118
[58] Field of Search ................... 375/118, 112, 111; 370/102, 108, 105.3, 101

[56] References Cited

U.S. PATENT DOCUMENTS

| | | | |
|---|---|---|---|
| 3,995,119 | 11/1976 | Pachynski, Jr. | 370/105.1 |
| 4,791,652 | 12/1988 | McEachern et al. | 375/112 X |
| 4,811,340 | 3/1989 | McEachern et al. | 370/102 |
| 4,920,547 | 4/1990 | Murakami | 375/112 |
| 4,941,156 | 7/1990 | Stern et al. | 375/118 |
| 4,996,698 | 2/1991 | Nelson | 375/118 |
| 5,014,271 | 5/1991 | Fujimoto et al. | 370/102 |
| 5,067,126 | 11/1991 | Moore | 370/102 |

OTHER PUBLICATIONS

W. Bartel et al., "Multiplexing of Plesiochronous Signals In A Digital Optical, Service-Integrated Subscriber Line System", Jun. 1985, IEEE International Conference on Communications 1985, vol. 1, pp. 165-170.

T. E. Moore et al., "Jitter Analysis for DS-3 To SONET Interface Circuit With Reduced Complexity", Jun. 1989, IEEE Pacific Rim Conference On Communications, Computers And Signal Processing, pp. 435-438.

Doowhan Choi, "Waiting Time Jitter Reduction", Nov. 1989, IEEE Transactions On Communications, vol. 37, No. 11, pp. 1231-1236.

Primary Examiner—Benedict V. Safourek
Assistant Examiner—Young Tse
Attorney, Agent, or Firm—R. John Haley

[57] ABSTRACT

Asynchronous DS-1 data is byte synchronized and converted to the SONET VT1.5 format by storing the DS-1 data in a store from which it is read in dependence upon a gapped clock signal which is produced by gapping a first gapped clock signal with a ratio of 208/193, which is the ratio of VT SPE bits per frame to DS-1 bits per frame. The first gapped clock signal is produced by gapping a VT1.5 synchronous clock signal. A frequency difference between the first gapped clock signal and the asynchronous data rate, multiplied in a frequency multiplier by the ratio of 208/193, is monitored by comparing the counts of modulo-208 counters, and, in dependence upon the monitored frequency difference, the gapping of the synchronous clock signal is controlled to achieve positive or negative stuffing and hence to compensate for the frequency difference.

13 Claims, 3 Drawing Sheets

METHOD OF AND CIRCUIT FOR SYNCHRONIZING DATA

This invention relates to a method of synchronizing data, and to a data synchronizing circuit for carrying out this method. In particular, the invention is concerned with synchronizing an asynchronous data signal so that it can be carried in the SONET (synchronous optical network) format, and with the control of pointers in mapping such signals into the SONET format which such synchronizing entails.

BACKGROUND OF THE INVENTION

The SONET format (American National Standards Institute, T1.105-1988) is increasingly being accepted for the communication of many forms of digital signals. In this format, STS signals (synchronous transport signals) of various levels are defined for carrying data, at various rates, and overhead information. For example, each 125 µs frame of an STS-1 signal, having a bit rate of 51.84 Mb/s, is considered as comprising 90 columns by 9 rows of 8-bit bytes, of which 3 columns are transport overhead (TOH) and the remaining 87 columns are referred to as the STS synchronous payload envelope (SPE). 84 of the 87 columns (the other 3 being used for SPE path overhead (POH) and fixed stuffing) can be divided into 7 VT (virtual tributary) groups each of 12 columns. Each VT group can accommodate various numbers and sizes of VT, for example 4 VT1.5s (i.e. four virtual tributaries each of size 1.5), 3 VT2s, 2 VT2s, or 1 VT6.

Although this invention has general applicability, for simplicity in the following detailed description reference is made only to the case of VT1.5s, it being understood that corresponding comments apply in other situations.

A VT1.5 comprises 3 columns of 9 rows of bytes, and hence 27 bytes per 125 µs frame. Of these 27 bytes, in a so-called floating VT mode one byte (the first byte, V1, V2, V3, or V4 in successive frames of a 4-frame superframe) serves as a VT payload pointer, and the remaining 26 bytes (the VT SPE) can accommodate the 193 bits per 125 µs frame of a conventional DS-1 signal, together with signalling information, VT POH, and fixed stuffing. In a convenient form of mapping, referred to as byte sync, the 24 bytes or DS-0 channels (192 bits) in the DS-1 frame are mapped directly into 24 bytes of the VT SPE, the remaining 2 bytes being used for the signalling, the DS-1 framing bit, the VT POH information byte V5, and stuffing.

A problem arises with this mapping from the facts that these 2 remaining bytes are adjacent one another in the VT SPE, the DS-1 signal is asynchronous to the VT, and a phase comparison is made between the VT SPE and the asynchronous DS-1 signal at a fixed point in the VT SPE mapping. Because the DS-1 signal is asynchronous, stuffing must be performed to compensate for its frequency difference relative to the synchronous network (VT frequency justification). This results in the position of these 2 remaining bytes relative to the VT SPE changing progressively over time. In known manner, the asynchronous DS-1 data is written into a data buffer from which it is subsequently read synchronously, to accommodate the stuffing.

Thus for example the phase comparison is made, i.e. the fill of the buffer is evaluated, at the time of the VT payload pointer byte V1. If for example the byte V5 immediately follows the byte V1 and the data buffer is becoming full so that a negative stuff and corresponding pointer adjustment is required, then a negative stuff is performed at the next stuffing opportunity. Consequently a stuff byte R, rather than a DS-1 data byte from the data buffer, is stuffed into the V3 byte position. Accordingly, at the time of the next byte V1 the data buffer fill evaluation still indicates that a negative stuff is required. Again this is performed at the next opportunity, but the data buffer is only emptied by one bit, namely the DS-1 framing bit, because the next byte to be stuffed in the V3 byte position is the signalling byte (the second of the 2 remaining bytes referred to above) rather than a data byte. Accordingly, the next evaluation of the data buffer fill still indicates that a negative stuff is required. This third negative stuff is performed at the next opportunity whereupon a DS-1 data byte is read out from the data buffer and its fill level, as evaluated at the time of the byte V1, is reduced.

At other times in the 125 µs frames, only a single negative stuff takes place because a data byte from the data buffer is immediately stuffed into the V3 byte position.

Thus there is an irregularity in the occurrence of stuffing to accommodate the asynchronous DS-1 data in the VT, in that most of the time single stuffs are performed, and occasionally three successive stuffs are performed in the above circumstances. This irregularity constitutes a jitter in the decoded (desynchronized) DS-1 signal, which is undesirable. Although this irregularity is explained above in relation to negative stuffing, it also occurs in the converse situation with positive stuffing.

Although this problem could be reduced by providing an additional stage of buffering for the VT SPE data, this is undesirable because it would introduce an additional data propagation delay. Furthermore, it is very desirable to integrate all of the circuitry needed for conversion between the DS-1 and VT1.5 signal formats in a single integrated circuit of as small a size as possible. The additional integrated circuit chip area which would be required for such an additional stage of buffering presents a disadvantage in this respect. Accordingly, the provision of an additional stage of buffering is not a particularly practical solution to the problem.

An object of this invention, therefore, is to provide an improved method of synchronizing data in which this problem is reduced or substantially avoided.

SUMMARY OF THE INVENTION

According to one aspect of this invention there is provided a method of synchronizing data comprising the steps of: storing data in a store at a first, asynchronous, rate; gapping a clock signal having a second, synchronous, rate greater than the first rate to produce a first gapped clock signal; gapping the first gapped clock signal with a predetermined ratio to produce a second gapped clock signal; reading data from the store in dependence upon the second gapped clock signal; monitoring a frequency difference between the first gapped clock signal and the first rate multiplied by the predetermined ratio; and, in dependence upon the monitored frequency difference, controlling the gapping of the clock signal having the second rate to compensate for the frequency difference.

Applied to the SONET format for signals in the VT group, the second rate is 6.912 MHz divided by an integer from 1 to 4, i.e. it is 6.912 MHz for a VT6, 3.456

MHz for a VT3, 2.304MHz for a VT2, and, as described below, 1.728 MHz for a VT1.5.

In the latter case, which is used for accommodating an asynchronous DS-1 signal in the VT1.5, the first rate is nominally 1.54 MHz and the predetermined ratio is 208/193. This ratio arises from the fact that, in each 125 μs frame, there are 193 bits of the DS-1 signal and 208 bits of the VT SPE.

Preferably the step of monitoring comprises counting pulses of the first gapped clock signal, counting pulses at the first rate multiplied by the predetermined ratio, and comparing a difference between the counted pulses with at least one threshold value. The threshold value is desirably a small value to minimize the necessary size of the data store.

The step of gapping the clock signal having the second rate conveniently comprises suppressing selected pulses of the clock signal, and the step of controlling the gapping preferably comprises selectively suppressing additional pulses or inhibiting the suppression of selected pulses of the clock signal. For the VT1.5, there are 27 bytes in each 125 μs frame 26 of which are normally used for the 26 bytes of VT SPE data in each 125 μs frame. The pulses of the clock signal are suppressed in groups of eight pulses, so that normally in each frame 26 groups of eight pulses are passed and one group of eight pulses is suppressed. In the event that the asynchronous data rate is too high and a negative stuff is necessary, in one frame the normally-suppressed group of eight pulses is not suppressed so that an additional byte of VT SPE data is included in the VT1.5 (in the byte V3 position). Conversely, in the event that the asynchronous data rate is too low and a positive stuff is necessary, an additional group of eight pulses of the clock signal is suppressed (following the byte V3 position).

According to another aspect of this invention there is provided a synchronizing circuit comprising: a data store; means for storing asynchronous data in the store; first gapping means for gapping a synchronous clock signal to produce a first gapped clock signal; second gapping means for gapping the first gapped clock signal with a predetermined ratio to produce a second gapped clock signal; means for reading data from the store in dependence upon the second gapped clock signal; monitoring means for monitoring a frequency difference between the first gapped clock signal and the asynchronous data rate multiplied by the predetermined ratio; and control means responsive to the monitoring means for controlling the first gapping means to compensate for the frequency difference.

Preferably the monitoring means comprises: a first counter for counting pulses of the first gapped clock signal; a second counter for counting, when enabled, pulses of the synchronous clock signal; frequency multiplier means for enabling the second counter at the asynchronous data rate multiplied by the predetermined ratio; and comparison means for comparing a difference between counts of the first and second counters with at least one threshold value.

To facilitate the comparison in the case of byte sync DS-1 synchronizing, preferably the comparison means is responsive to only that part of the count of each of the first and second counters greater than the 3 least significant bits representing the count. The first and second counters are conveniently 8-bit modulo-208 counters, corresponding to the predetermined ratio of 208/193, of which only the 5 most significant bit counter outputs are compared in the comparison means.

BRIEF DESCRIPTION OF THE DRAWINGS

The invention will be further understood from the following description with reference to the accompanying drawings, in which:

Referring to FIG. 1, there is illustrated at the top left the format of one 125 μs frame of a VT1.5 in accordance with American National Standard T1.105-1988 and as shown in FIG. 9 of that standard. This format comprises 27 8-bit bytes which are illustrated as being arranged in 3 columns and 9 rows, consistent with the 9-row arrangement of bytes in the standard.

In the center, FIG. 1 illustrates the corresponding 4-frame superframe in the floating mode, as described with reference to FIGS. 20, 36, and 37 of the standard. As represented by arrows 10, the 27 bytes in each 125 μs VT1.5 frame are mapped consecutively into the VT superframe in accordance with the numbering 1 to 27 shown at the right-hand side of the VT superframe. The first byte in each of the four consecutive VT1.5 frames of the 500 μs VT superframe, i.e. bytes V1 to V4 as illustrated, are VT payload pointer bytes as described further below. The bytes V1 and V2 together contain a pointer to a VT POH (path overhead) byte V5, in accordance with a numbering scheme 0 to 103 shown at the left of the VT superframe and corresponding to the 104 bytes of the VT SPE (synchronous payload envelope) which is carried by the VT superframe. The byte V5 represents the start of the VT SPE and can have an arbitrary position in the VT superframe bytes 0 to 103.

At the right, FIG. 1 illustrates the VT SPE, starting with the byte V5 moved as represented by an arrow 12. As should be appreciated, the VT SPE has a superframe of 500 μs, comprises four frames each of 26 bytes, and in view of the arbitrary position of the byte V5 can be staggered in relation to the VT superframe; i.e. it generally starts in one VT superframe and ends in the next VT superframe.

Figure 1:
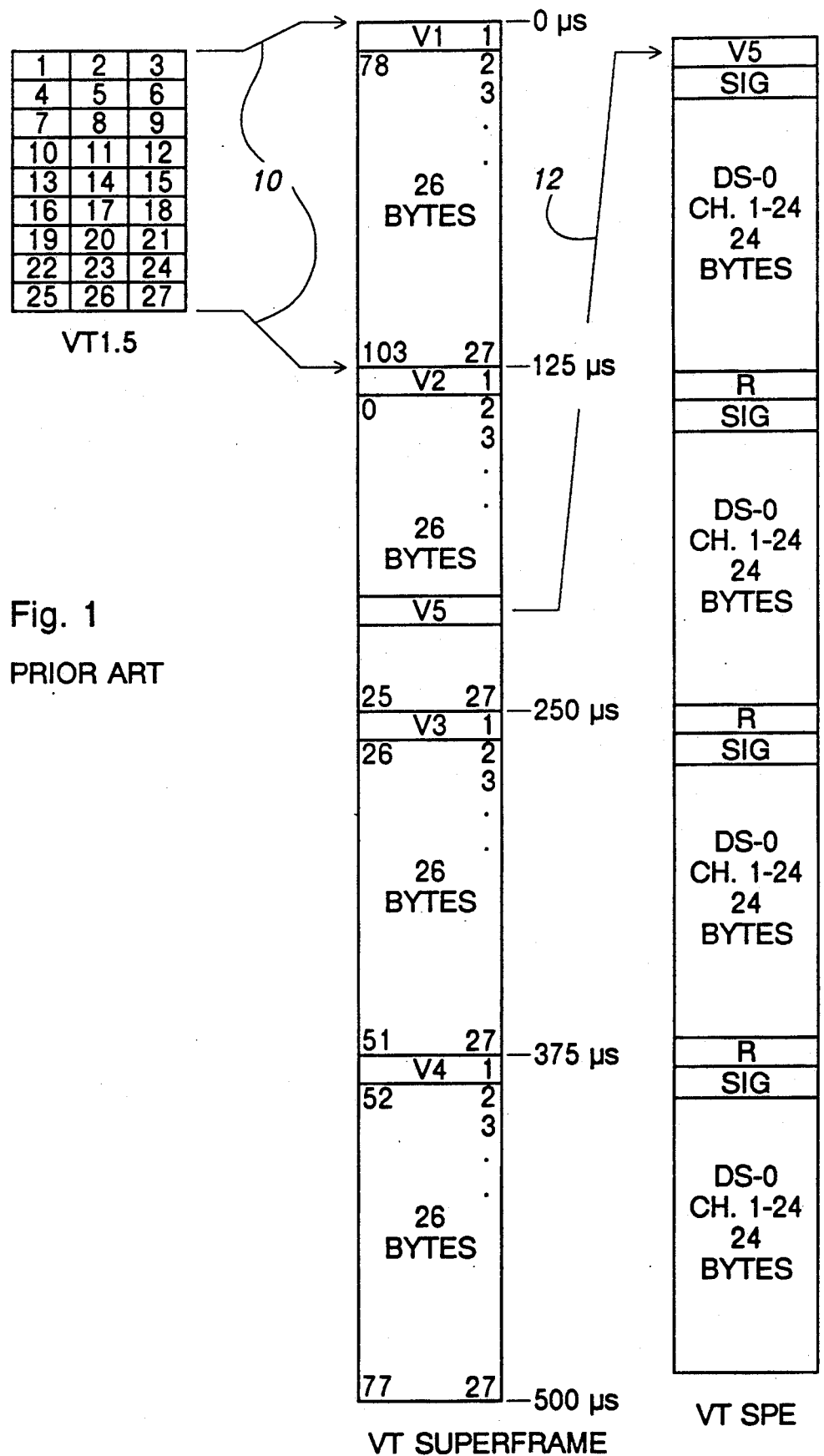
FIG. 1 illustrates the known format of a byte sync DS-1 signal in a VT1.5.

As illustrated, the first byte in the first frame of the VT SPE is the VT POH byte V5. The first byte in each other frame of the VT SPE is a fixed stuffing byte R. The second byte SIG in each frame of the VT SPE is a signalling byte comprising 8 bits of which, as described in FIG. 47 of the standard, 2 bits constitute a signalling phase indicator, 4 bits provide for signalling information, 1 bit is the DS-1 framing bit, and 1 bit is a fixed stuffing bit. In addition to these two bytes, each frame of the VT SPE provides 24 bytes, one for each of the 24 DS-0 channels (192 bits) in the DS-1 signal, which are filled in a byte synchronous manner.

In order to accommodate VT frequency justification, i.e. positive or negative stuffing due to the asynchronous nature of the DS-1 signal, the VT payload pointer bytes are used. More particularly, the pointer to the byte V5 contained in the bytes V1 and V2 can be a 10-bit pointer, of which 5 bits are inverted to indicate a positive stuff in the current VT superframe and the other 5 bits are inverted to indicate a negative stuff in the current VT superframe. Majority decision circuitry, and a limit of one stuff per four VT superframes, are used to avoid ambiguity as more fully described in the standard. For a negative stuff (DS-1 frequency is high), the byte V3 is overwritten with a byte of the VT SPE, and for a positive stuff (DS-1 frequency is low) no VT SPE data byte is written into the byte immediately following the byte V3.

As has been explained in the introduction, if for example the data rate of an asynchronous DS-1 signal which is carried by the VT1.5 is higher than its nominal rate of 1.544 Mb/s, then negative stuffing must be performed together with negative pointer adjustments to accommodate this higher data rate. Thus in some of the VT superframes the byte V3 is used to carry a byte of the VT SPE, this being indicated in the VT payload pointer bytes V1 and V2 by bit inversion as mentioned above. In the next VT superframe following each VT superframe in which there is a negative stuff, the pointer in the bytes V1 and V2 is decreased by one (modulo-104) to indicate the consequently modified position of the byte V5, which is moved up by one byte. The new pointer value is maintained constant for at least another two VT superframes, in accordance with the standard, so that successive stuffs can take place at a maximum rate of one every four VT superframes.

As also explained in the introduction, this presents a jitter problem in that, for example when the byte V5 immediately follows the byte V1, i.e. it is in the position numbered 78, and a negative stuff is required due to filling of the data buffer into which the DS-1 signal is written, three consecutive negative stuffs take place as a stuff byte R, then the following signalling byte SIG, and finally the following data byte (DS-0 channel 1 byte) are successively stuffed into the byte V3. Conversely, three consecutive positive stuffs can take place when the byte V5 and the immediately following byte SIG immediately precede the byte V1.

Figure 2:
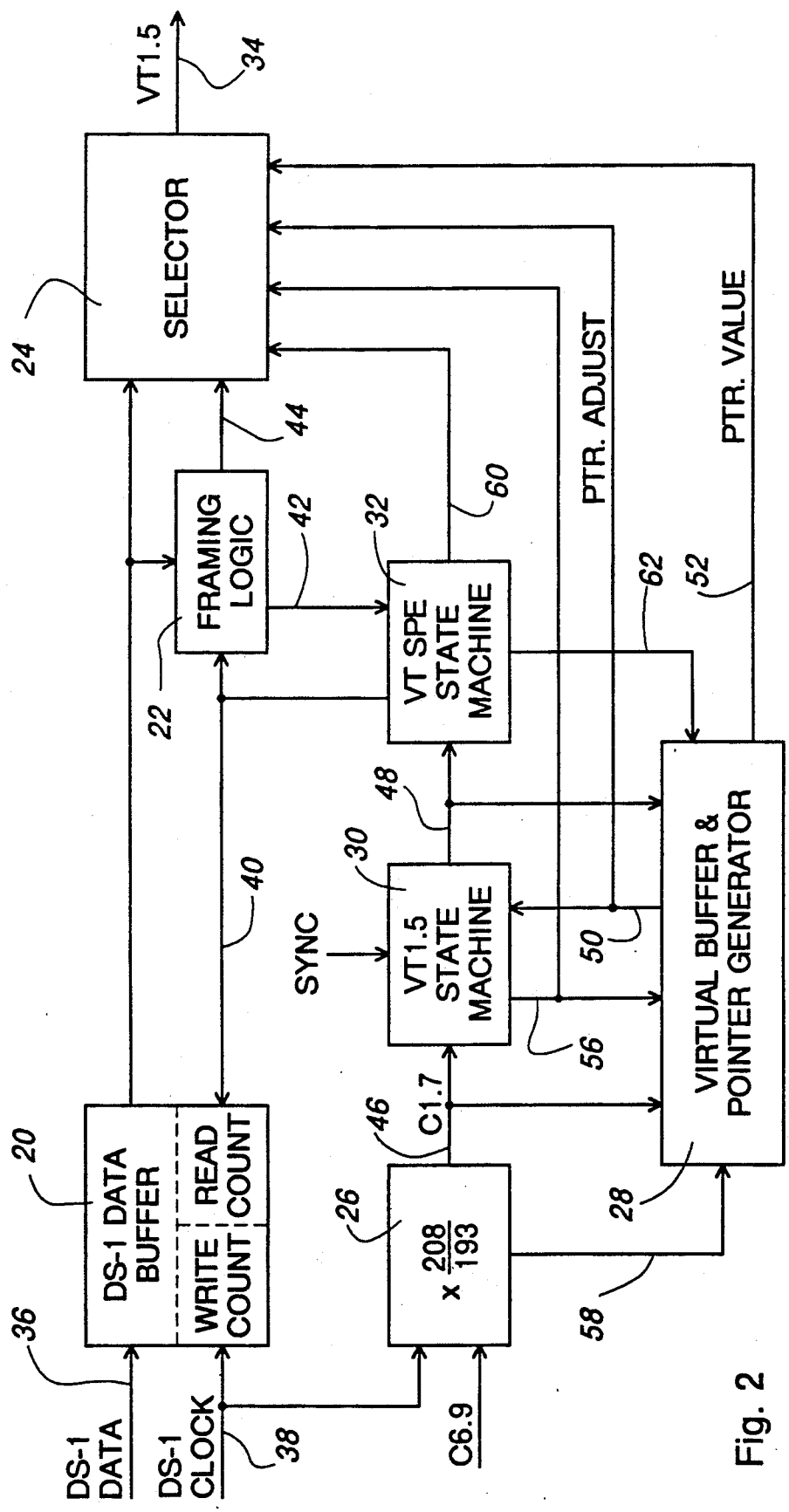
FIG. 2 is a block diagram illustrating a byte sync DS-1 to VT1.5 synchronizing circuit in accordance with an embodiment of this invention.

This jitter problem is substantially avoided by using a byte sync DS-1 to VT1.5 synchronizing circuit in accordance with an embodiment of this invention and as illustrated in FIG. 2.

Referring to FIG. 2, the synchronizing circuit shown therein comprises a DS-1 data store or buffer 20, including write and read address counters, a DS-1 framing logic circuit 22, and a selector 24. The synchronizing circuit further comprises a frequency multiplier 26, a virtual buffer and pointer generator 28, a VT1.5 state machine 30, and a VT SPE state machine 32. The blocks 26, 28, and 30 are described below in greater detail with reference to FIG. 3, from which it will be appreciated that the state machine 30 comprises frequency division, counting, and logic circuits. The state machine 32 similarly comprises such circuits operating as described below. The selector 24 contains no buffers, and merely selects among the various signals with which it is supplied as described below to produce the VT1.5 bytes on a VT1.5 output line 34. The blocks 20 and 22 are of generally known form and a detailed description of these is unnecessary.

The asynchronous DS-1 signal bits incoming on a line 36 are written into the data buffer 20 under the control of a recovered DS-1 clock signal supplied on a line 38. The VT SPE state machine 32 produces on a line 40 a gapped clock signal, the gaps corresponding to the VT1.5 and VT SPE overhead, in accordance with which the DS-1 bits are read out from the data buffer 20 to the selector 24. The read out DS-1 bits and the gapped clock signal on the line 40 are also supplied to the DS-1 framing logic circuit 22, which supplies to the VT SPE state machine 32 via a line 42 frame pulses which are used to align the VT SPE state machine 32 to the DS-1 frame. The framing logic circuit 22 also supplies framing and signalling information via a line 44 to the selector 24 for incorporation in the VT1.5 data stream.

In contrast to known buffer store arrangements in which the relative phases of the writing and reading are directly compared, in the circuit of FIG. 1 there is no such direct comparison of writing and reading phases, i.e. of the counts of the write and read counters. Accordingly, in this circuit the counts of the write and read counters are reset, by means not shown, on initial power-up and error conditions such as buffer overflow or underflow or loss of the DS-1 signal, so that the write count leads the read count by half the count capacity of these counters, and hence by half the data buffer size.

The data buffer size is desirably as small as possible to facilitate integration of the synchronizing circuit and to minimize data propagation delays, but must be sufficient to accommodate allowed variations in the DS-1 data rate and the gapped reading from the buffer necessary for the overhead information in the VT SPE and VT1.5 signals. A data buffer size of at least 70 bits has been found to be required, and in practice a size of 80 bits may conveniently be used.

Figure 3:
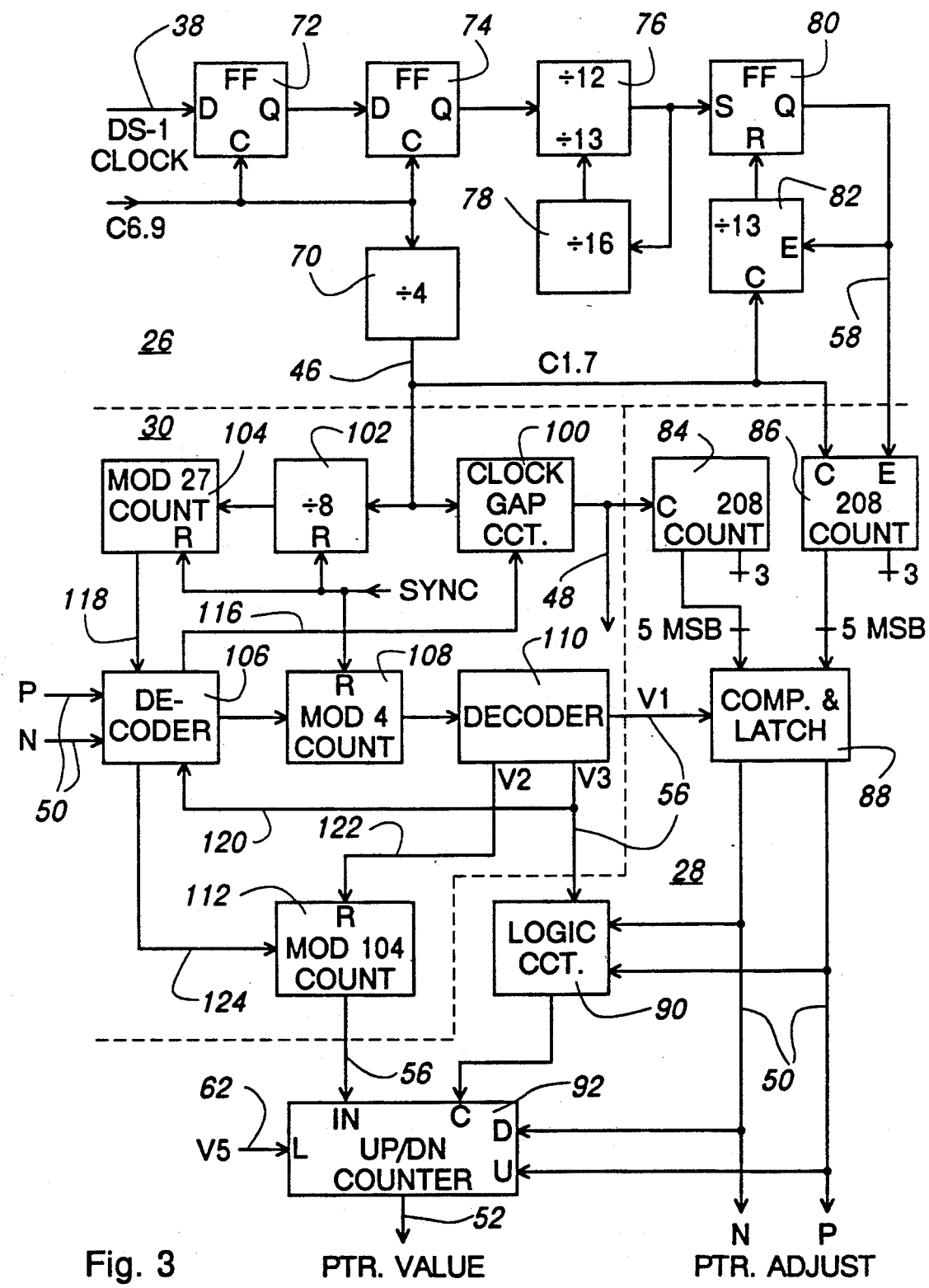
FIG. 3 illustrates in greater detail parts of the synchronizing circuit of FIG. 2.

A synchronous clock signal C6.9 having a frequency of 6.912 MHz is supplied, from circuitry not shown for processing the VT1.5 signal, to the frequency multiplier 26, in which it is frequency divided by four as described below with reference to FIG. 3 to produce a synchronous clock signal C1.7, at a frequency of 1.728 MHz, on a line 46, this clock signal being supplied to the blocks 28 and 30. The VT1.5 state machine 30 is also supplied from the VT1.5 signal processing circuitry with a signal SYNC which serves to align the state of the VT1.5 state machine 30 to this following circuitry. The VT1.5 state machine 30 has 108 states which are cycled through consecutively, corresponding to the VT superframe illustrated in FIG. 1.

The VT1.5 state machine 30 produces from the C1.7 clock signal a first gapped bit clock signal, normally comprising groups each of 8 pulses of the C1.7 clock signal except during the bytes V1, V2, V3, and V4, on a line 48 leading to the blocks 28 and 32. During a stuffing event and consequent pointer adjustment, this first gapped clock signal is modified in that for a negative stuff it is not gapped during the byte V3, and for a positive stuff it is additionally gapped during the data byte which follows the byte V3. The virtual buffer and pointer generator 28 indicates, via lines 50 to the VT1.5 state machine 30 and to the selector 24, the need for and direction of a stuffing event and consequent pointer adjustment, and also provides a pointer value to the selector 24 via lines 52, all as further described below.

The VT1.5 state machine 30 supplies control and timing signals via lines 56, at the times of the bytes V1 to V4, to the virtual buffer and pointer generator 28 and to the selector 24. The virtual buffer and pointer generator 28 is also supplied via a line 58 with a control signal from the multiplier 26, which produces this control signal by frequency multiplying the DS-1 clock signal on the line 38 by a factor of 208/193. It should be appreciated that this factor is the ratio of the number of bits in each 125 μs frame of the VT SPE to the number of bits in each 125 μs frame of the incoming DS-1 signal.

The VT SPE state machine 32 has 104 states which are consecutively cycled through in response to the first gapped clock signal on the line 48, corresponding to the 4 frames of 26 bytes in the VT SPE superframe shown in FIG. 1. It gaps the first gapped clock signal on the line 48 with the gapping ratio of 208/193, corresponding to the nature of the 193 DS-1 data bits in the VT SPE frame of 208 bits as shown in FIG. 1, to produce the second gapped bit clock signal on the line 40 as already described. The VT SPE state machine 32 also produces control signals on lines 60 to the selector 24, and a timing signal at the time of the byte V5 on a line 62 to the virtual buffer and pointer generator 28.

The operation of the parts of the synchronizer circuit described above is further described below with additional reference to FIG. 3, which shows the blocks 26, 28, and 30 in greater detail. The blocks 26 and 28 serve to determine when stuffing is necessary and to provide an adjusted pointer value accordingly, as further described below. In FIG. 3, broken lines represent the separation of the circuitry shown into the blocks 26, 28, and 30.

The multiplier 26 comprises a ÷4 frequency divider 70, two D-type flip-flops 72 and 74, a controllable ÷12/÷13 frequency divider 76, a ÷16 frequency divider 78, an RS flip-flop 80, and a ÷13 frequency divider 82.

The multiplier 26 is supplied with the clock signal C6.9 and divides this by four in the frequency divider 70 to produce the clock signal C1.7 on the line 46 as already described. The clock signal C6.9 is also supplied to the clock inputs C of the flip-flops 72 and 74 which are connected in sequence for retiming the asynchronous DS-1 clock signal on the line 38. The asynchronous DS-1 clock signal is supplied to the data input D of the first flip-flop 72, and its retimed equivalent is produced at the output Q of the second flip-flop 74, from which it is supplied to the input of the controllable frequency divider 76.

The controllable frequency divider 76 normally divides by 12, but is controlled to divide by 13 in response to a signal supplied to an input referenced ÷13. This signal is supplied from the output of the ÷16 frequency divider 78, whose input is connected to the output of the controllable frequency divider 76. Consequently, these two frequency dividers cycle through 15 states of the divider 78 in which the divider 76 divides by 12, and then one state of the divider 78 in which the divider 76 divides by 13, for a total sequence of 193 (15×12+13) periods of the DS-1 clock signal.

The output of the controllable frequency divider 76 is also supplied to the set input S of the RS flip-flop 80, whose reset input R is connected to the output of the ÷13 frequency divider 82. The output Q of the flip-flop 80 is connected to the line 58 and to an enable input E of the ÷13 frequency divider 82. When enabled by the output of the flip-flop 80 on the line 58, the ÷13 frequency divider divides the clock signal C1.7, which is supplied to its clock input C, by 13. Thus during each of the 16 states of the frequency divider 78, the frequency divider 82 completes one frequency division cycle on 13 cycles of the clock signal C1.7, to provide the desired frequency multiplication of 208/193 (16×13=208).

The virtual buffer and pointer generator 28 comprises two MOD (modulo) 208 counters 84 and 86, a comparator and latch 88, a logic circuit 90, and an up/down counter 92. The clock signal C1.7 on the line 46 is applied to the clock input C, and the signal on the line 58 is supplied to an enable input E, of the counter 86 in the same manner as to the ÷13 frequency divider 82, so that this counter 86 operates in synchronism with the 16 ÷13 cycles defined by the frequency dividers 78 and 82. In other words, the counter 86 counts pulses of the clock signal C1.7 when it is enabled to count via its input E, and it is enabled by the frequency multiplier 26 to count at a rate which is 208/193 times the actual rate of the asynchronous DS-1 data signal on the line 38. The remainder of the virtual buffer and pointer generator 28 is described further below.

The VT1.5 state machine 30 comprises a clock gapping circuit 100, a ÷8 frequency divider 102, a MOD 27 counter 104, a decoder 106, a MOD 4 counter 108, a further decoder 110, and a MOD 104 counter 112. The clock signal C1.7 on the line 46 is supplied to the clock gapping circuit 100 to produce the gapped bit clock signal, under the control of the decoder 106 via a control line 116, on the line 48 as already described. The bit clock signal C1.7 on the line 46 is also supplied to the ÷8 frequency divider 102 to produce at its output a corresponding byte clock signal which is counted by the MOD 27 counter 104. The 27 states of this counter 104 correspond to the 27 bytes in each frame of the VT1.5 as shown in FIG. 1, and are decoded by the decoder 106 to which the count of the counter 104 is supplied via lines 118. The signal SYNC from the following VT1.5 processing circuitry already referred to is supplied to a reset input R of the divider 102 and the counters 104 and 108, to synchronize their operation for the VT1.5 signal.

The decoder 106 is also supplied via the lines 50 with pointer adjustment signals N and P which are described further below, and with a V3 byte timing signal from the decoder 110 via a line 120, and uses these signals to control the clock gapping circuit 100 via the line 116 in the manner already described to achieve stuffing when necessary. In the first state of each cycle of the counter 104, corresponding to the bytes V1 to V4 as shown in FIG. 1, the decoder 106 supplies an output pulse to the MOD 4 counter 108 whose states correspond to the 4 frames of each VT superframe. The count of this counter 108 is supplied to the decoder 110 which supplies timing signals at the times of the bytes V1 to V4 to its outputs. The timing signal at the time of the byte V2 is supplied via a line 122 to a reset input R of the MOD 104 counter 112, which is supplied via a line 124 from the decoder 106 with a pulse during each of the other 26 states of the counter 104. Consequently, the counter 112 provides a byte count from 0 to 103 during each VT superframe, with the zero count occurring following the byte V2 as shown at the left-hand side of the VT superframe in FIG. 1.

In the absence of a stuff and pointer adjustment, and also in the event of a stuff and pointer adjustment when the time of the byte V5 follows the time of the byte V3 in the VT superframe, the up/down counter 92 serves simply as a latch, being controlled via a load input L, by the signal at the time of the byte V5 and supplied by the VT SPE state machine 32 on the line 62, to load the count of the counter 112 supplied to parallel data inputs IN via the lines 56. The counter then supplies this latched count as the pointer value on the lines 52 to the selector 24.

In the event of a negative or positive stuff and corresponding pointer adjustment, as described below the comparator and latch 88 produces a signal on the line N or P respectively, these lines constituting the pointer adjustment lines 50 already referred to. These signals are supplied respectively to down (D) and up (U) count direction control inputs of the up/down counter 92. A clock input C of this counter 92 is supplied by the logic circuit 90 with a clock pulse at the V3 byte time, supplied from the decoder 110, in the presence of a signal on either of the lines N and P. Thus when the time of the byte V5 precedes the time of the byte V3 in the VT superframe, this clock pulse at the V3 byte time causes the latched count to be decreased (negative adjustment) or increased (positive adjustment) at the V3 byte time, i.e. before it is used by the selector 24 in the bytes V1 and V2 of the next VT superframe.

The MOD 208 counter 84 has the gapped bit clock signal on the line 48 supplied to its clock input, and thus counts the number of VT SPE bits which are requested by the VT1.5 state machine 30. The MOD 208 counter 86, as can be understood from the preceding description, provides a count of the number of VT SPE bits that are on average created from the DS-1 data buffer 20, i.e. a count of the asynchronous DS-1 bit rate frequency multiplied by the factor of 208/193. The counts in these counters can therefore be regarded as read and write pointers, respectively, to a virtual buffer for the VT SPE bits. A virtual buffer is referred to here because no separate VT SPE bit buffer is actually provided. The counters 84 and 86 are both reset to zero with resetting of the DS-1 data buffer counters as already described. The count capacity of 208 for each counter corresponds to the number of bits in each VT SPE superframe as shown in FIG. 1, and requires that the counters be 8-bit counters.

As the VT SPE is byte synchronous, whereas the counters 84 and 86 are clocked at bit rates, only the 5 most significant bit (MSB) outputs of each 8-bit counter are used, the three least significant bit outputs being dropped to achieve a ÷8, or bit to byte, conversion. The 5 MSB outputs of the counters 84 and 86 are supplied to inputs of the comparator and latch 88, which determines the difference between these byte counts and compares it with positive and negative stuff threshold values. The results of these comparisons are latched at the time of the byte V1, supplied from the decoder 110, to constitute respectively the positive P and negative N pointer adjustment control signals on the lines 50.

For example, in order to avoid oscillation in the pointer adjustment (alternate positive and negative stuffing) the thresholds may be set so that a difference of more than one byte between the compared counts must exist for a positive or negative stuff to be produced. In this case if the comparator 88 detects that the count from the counter 84 exceeds that from the counter 86 by two bytes it will produce the signal P and hence a positive stuff and pointer adjustment, whereas if it detects that the count from the counter 86 exceeds that from the counter 84 by two bytes it will produce the signal N and hence a negative stuff and pointer adjustment. The relatively small thresholds used in the comparator and latch 88 facilitate the small size of DS-1 data buffer 20 which can be used in the synchronizer circuit.

In order to facilitate the comparison in the comparator and latch 88, the counters 84 and 86 can be arranged to count in opposite directions (one up, the other down), and the comparator and latch 88 can comprise an adder, whose output can normally be in a range from −2 to +2 bytes, and a simple logic or gating circuit for producing the signals P and N on the lines 50.

The synchronizing circuit described above with reference to FIGS. 2 and 3 substantially eliminates the problem of jitter discussed in the introduction, without requiring the presence of an additional stage of data buffering and the practical difficulties which this entails. This is achieved by comparing the counts of the counters 84 and 86 to determine the need for stuffing and pointer adjustments, these counters effectively counting respectively the rate of VT SPE bits taken for the VT1.5 signal and the frequency-multiplied (by 208/193) rate of DS-1 bits supplied in the asynchronous DS-1 signal. As this comparison inherently takes into account the format of the VT SPE as described with reference to FIG. 1, the problem of jitter arising from this format is avoided.

Although the invention has been described above predominantly in relation to negative stuffing, similar comments apply equally to the situation for positive stuffing, i.e. in the situation where the asynchronous DS-1 signal has a relatively low frequency. In addition, although the above description relates specifically to a byte sync DS-1 to VT1.5 synchronizing circuit, the principles of the invention are also applicable to other forms of synchronizing circuit, e.g. for other incoming data signals, other VT sizes in the SONET format, and for other signal formats in which there is a potential jitter problem due to the nature of the overhead information in the synchronized signal.

Accordingly, numerous modifications, variations, and adaptations may be made to the described embodiment without departing from the scope of the invention as defined in the claims.

What is claimed is:

1. A method of synchronizing data comprising the steps of:
    storing data in a store at a first, asynchronous, rate;
    gapping a clock signal having a second, synchronous, rate greater than the first rate to produce a first gapped clock signal;
    gapping the first gapped clock signal with a predetermined ratio to produce a second gapped clock signal;
    reading data from the store in dependence upon the second gapped clock signal;
    monitoring a frequency difference between the first gapped clock signal and the first rate multiplied by the predetermined ratio; and
    in dependence upon the monitored frequency difference, controlling the gapping of the clock signal having the second rate to compensate for the frequency difference.

2. A method as claimed in claim 1 wherein the second rate is 6.912 MHz divided by an integer from 1 to 4.

3. A method as claimed in claim 1 wherein the second rate is 1.728 MHz.

4. A method as claimed in claim 1 wherein the first rate is nominally 1.544 MHz and the predetermined ratio is 208/193.

5. A method as claimed in claim 1 wherein the step of monitoring comprises counting pulses of the first gapped clock signal, counting pulses at the first rate multiplied by the predetermined ratio, and comparing a difference between the counted pulses with at least one threshold value.

6. A method as claimed in claim 1 wherein the step of gapping the clock signal having the second rate comprises suppressing selected pulses of the clock signal, and the step of controlling the gapping comprises selectively suppressing additional pulses or inhibiting the suppression of selected pulses of the clock signal.

7. A method as claimed in claim 6 wherein the pulses of the clock signal are suppressed in groups of eight pulses.

8. A synchronizing circuit comprising:
a data store;
means for storing asynchronous data in the store;
first gapping means for gapping a synchronous clock signal to produce a first gapped clock signal;
second gapping means for gapping the first gapped clock signal with a predetermined ratio to produce a second gapped clock signal;
means for reading data from the store in dependence upon the second gapped clock signal;
monitoring means for monitoring a frequency difference between the first gapped clock signal and the asynchronous data rate multiplied by the predetermined ratio; and
control means responsive to the monitoring means for controlling the first gapping means to compensate for the frequency difference.

9. A synchronizing circuit as claimed in claim 8 wherein the monitoring means comprises:
a first counter for counting pulses of the first gapped clock signal;
a second counter for counting, when enabled, pulses of the synchronous clock signal;
frequency multiplier means for enabling the second counter at the asynchronous data rate frequency multiplied by the predetermined ratio; and
comparison means for comparing a difference between counts of the first and second counters with at least one threshold value.

10. A synchronizing circuit as claimed in claim 9 wherein the comparison means is responsive to only that part of the count of each of the first and second counters greater than the 3 least significant bits representing the count.

11. A synchronizing circuit as claimed in claim 10 wherein the first gapping means is arranged for gapping the synchronous clock signal by suppressing groups of 8 consecutive pulses of the synchronous clock signal.

12. A synchronizing circuit as claimed in claim 9 wherein the first and second counters are modulo-208 counters and the predetermined ratio is 208/193.

13. A synchronizing circuit as claimed in claim 8 wherein the first gapping means is arranged for gapping the synchronous clock signal by suppressing groups of 8 consecutive pulses of the synchronous clock signal, and the control means for controlling the first gapping means comprises means for controlling the first gapping means to suppress an additional group of 8 pulses when the monitored frequency difference is of a first polarity and to inhibit the suppression of a group of 8 pulses of the clock signal when the monitored frequency difference is of a second, opposite, polarity.

* * * * *